United States Patent [19]

Declerco et al.

[11] 4,289,448

[45] Sep. 15, 1981

[54] DEVICE FOR LIMITING THE FLAPPING MOVEMENTS OF A ROTARY-WING AIRCRAFT MAIN ROTOR

[75] Inventors: Marc A. Declerco, Pelissanne; Gerard Margant, Aix en Provence, both of France

[73] Assignee: Societe Nationale Industrielle Aerospatiale, France

[21] Appl. No.: 68,797

[22] Filed: Aug. 22, 1979

[30] Foreign Application Priority Data

Aug. 23, 1978 [FR] France ............................... 78 24480

[51] Int. Cl.³ .............................................. B64C 27/40
[52] U.S. Cl. ....................................... 416/140; 416/46
[58] Field of Search ................... 416/140 A, 106, 107, 416/46

[56] References Cited

U.S. PATENT DOCUMENTS

| | | | |
|---|---|---|---|
| 2,151,215 | 3/1939 | Larsen | 416/140 A |
| 2,742,098 | 4/1956 | Jovanovich | 416/140 A |
| 2,906,348 | 9/1959 | Lovegrove | 416/140 A |
| 2,928,478 | 3/1960 | DuPont | 416/140 A |
| 2,946,391 | 7/1960 | LeMont | 416/140 A |
| 3,147,810 | 9/1964 | Mosinskis | 416/140 A |
| 3,623,682 | 11/1971 | Kretz | 416/140 A X |
| 3,679,322 | 7/1972 | Mouille | 416/114 X |
| 3,853,426 | 12/1974 | Rybicki | 416/140 A |
| 4,203,708 | 5/1980 | Rybicki | 416/140 A X |

Primary Examiner—Everette A. Powell, Jr.
Attorney, Agent, or Firm—Karl W. Flocks; A. Fred Starobin

[57] ABSTRACT

This invention concerns devices for limiting the flapping movements of the blades of a rotary-wing aircraft main rotor. The device described has a well known reciprocal ring lower abutment common to all the blades. The disadvantages of this well known arrangement is obviated by the use of separate upper abutment devices for each blade. Each upper abutment device comprises a bent lever a first arm of which forms an abutment part and a second arm supports a weight. The lever can oscillate on a pivot and is acted upon by a spring which holds it in a stop position when the rotor stops so that the first arm of the lever extends almost parallel to the axial plane of symmetry of the associated blade. When the rotor rotates at sufficient speed centrifugal force pivots the lever away from the blade root.

7 Claims, 3 Drawing Figures

DEVICE FOR LIMITING THE FLAPPING MOVEMENTS OF A ROTARY-WING AIRCRAFT MAIN ROTOR

DESCRIPTION

The invention relates to a device for limiting the flapping movements of the blades of a rotary-wing aircraft main rotor, specially when the rotor is turning slowly or not at all.

There are a large number of known devices of this kind.

U.S. Pat. No: 2,742,098 in the name of D. K. Jovanovich describes a lower abutment for a three-bladed helicopter rotor mainly comprising "reciprocal" rings mounted in a casing concentric with the rotor shaft so that they can slide freely in a plane perpendicular to the shaft; the means connecting the root of each rotor blade to the hub, via mechanical joints, each have a lower lever, the end of which engages in a radial slot in the aforementioned casing so as to co-operate with the periphery of the corresponding rings, so that when the rotor stops, the downward sag of the blades is limited by the reciprocal rings, which then occupy a central position exactly concentric with the rotor axis.

U.S. Pat. No: 2,614,640 in the name of M. D. Buivid describes independent lower abutments for each blade of a main helicopter rotor. Each independent lower abutment is borne by a first lever pivotably mounted around a substantially horizontal shaft secured to the hub. Two second levers bearing lower weights are pivoted to the lower part of the first lever and coupled to the first lever by respective springs. The device is such that, when the rotor stops, the spring holds each second lever in an almost vertical position in which it holds the first or abutment-bearing lever in an upper position where the abutment can limit the bending of the corresponding blade, whereas when the rotor rotates a sufficient speed, the centrifugal force applied to each weight against the action of the spring retracts the second levers, which consequently allow the first lever to pivot downwards so that the corresponding abutment is retracted.

U.S. Pat. No: 2,719,593 in the name of R. P. Alex likewise describes independent lower abutments for each blade of a main helicopter rotor. Each independent abutment mainly comprises a bent lever having one arm forming an abutment and a second arm bearing a weight. The bent lever is mounted so that it can slide on a pivot horizontally secured to the rotor hub. A spring acts on the pivoting lever so that when the rotor stops, it holds the lever in a position where its first arm limits the downward motion of a component secured to the drag hinge of the corresponding blade, so as to limit the sagging thereof. The two arms of the bent lever form an angle such that when the rotor rotates, the centrifugal force applied to the weight tends to overcome the force of the spring and pivot the lever in a direction such that the abutment of its first arm moves the component secured to the corresponding blade downwards, so as to retract the abutment.

U.S. Pat. No. 3,147,810 describes a rotary-wing aircraft rotor having lower and upper abutments for each blade, each lower and upper abutment being constructed in similar manner to those described in the two last-mentioned U.S. patent numbers.

U.S. Pat. No: 2,465,674 in the name of S. L. Crowell describes independent lower abutments for each blade of a main helicopter rotor. Each lower abutment is borne by a first lever pivotably mounted around a substantially horizontal axis secured to a disc forming the rotor hub. A weight is pivotally mounted around another horizontal shaft on a plate, which can slide above the disc, towards which it is pushed by a spring. A second lever bears the weight and is coupled to the first or abutment-bearing lever so that, when the rotor is moving at a sufficient speed, it pivots the first lever to a position where the corresponding abutment is retracted. When the disc for adjusting the pitch of the various rotor blades moves downwards, a vertical push rod actuated by the disc pushes the sliding plate downwards and compresses the corresponding spring, and the plate pivots the first lever so as to bring the corresponding abutment into an operating position, into which it is likewise brought by the second or weight-bearing lever when the rotor speed decreases. This abutment system, accordingly, is very complicated and is unreliable.

Of course, a common lower abutment for all the blades of a rotary-wing aircraft rotor, of the reciprocal ring kind described in the first mentioned U.S. patent specification, is much simpler, less expensive and more reliable than independent lower abutments for each blade, of any of the kinds described in the other specifications that have been mentioned. However, a common reciprocal-ring lower abutment of the aforementioned kind has the following disadvantages. When the rotor rotates before take-off or when it slows down before completely stopping after landing, the aerodynamic lift forces acting on the blades are greatly reduced, so that the resultant of the forces on each blade is less than the weight of the blade. Consequently, the blade pivots downwards around its flapping hinge and bears against the reciprocal ring, which is disposed accordingly. In the absence of wind, and if the pilot places the cyclic control substantially in neutral position, the various blades bear together and with the same force on the reciprocal ring, which then remains in the centre position, thus holding the blades at substantially the same height relative to the fuselage, with sufficient clearance between it and the blade ends. However, if as frequently happens, particularly when a helicopter has to land or take-off from a launching platform at sea, where winds are violent and turbulent—if a gust occurs during the critical take-off phases or rotor stoppage phases and violently presses a blade downwards the blade will violently bear against the reciprocal ring, which is not subjected to sufficient reactional forces from the other blades. The ring thus takes an extreme position where it does not prevent the blade, after being violently pushed downwards, from reaching a dangerous, very inclined, position where its end may strike or even cut the helicopter tail or cabin.

This disadvantage, of course, does not occur in the case of independent lower abutments for each blade as described in some of the previously mentioned specifications, but this results in greater complexity, higher cost, and lower reliability.

Finally, the aforementioned independent lower abutments and the reciprocal ring do not oppose the movements of the blades when the rotor has stopped or is rotating slowly and the blades are pushed upwards by a strong gust. In that case, the stressed blade may assume a high angle of conicity and subsequently fall heavily on the lower abutment, thus damaging the abutment and itself undergoing instantaneous bending stress much higher than the loads which it can normally absorb, so that it may be put out of action.

A first object of the invention is to obviate the aforementiond disadvantages while still using a common lower abutment of the reciprocal ring kind, the advantages of which have been pointed out.

A second object of the invention is to design a device for limiting the flapping movements of the blades of a rotary-wing aircraft main rotor, specially when the rotor is moving slowly or not at all, this device comprising common lower abutment means with a reciprocal ring common for all the blades, and separate upper abutment means for each blade, each upper abutment mainly comprising a bent lever having a first arm formed with an abutment part for the root of the corresponding blade and a second arm connected to a predetermined weight, the said lever being mounted so that it can oscillate on a pivot secured to the top part of the rotor hub parallel to its axis, near the axial plane of symmetry of the corresponding blade at rest, and a spring connected to the said lever so as to return it, when the rotor stops, in a stop position where the first arm of the said lever extends substantially parallel to the axial plane of symmetry of the blade, whereas, when the rotor rotates at a sufficient speed, the centrifugal force applied to the said weight overcomes the force of the said spring and thereby rotates the said lever to that the abutment part of its first arm moves away from the root of the corresponding blade.

When a gust of wind pushes down one blade of a rotor equipped with the device according to the invention, the blade root, as previously described, tends to push back the reciprocal ring which in turn tends to push back at least one of the other rotor blades, but the last-mentioned blades are prevented from rising by the upper abutments, which are always in the operative position when the rotor is at rest or turning slowly. Accordingly, the device according to the invention comprises a combination of known means which cooperate with one another to reduce the risk of damaging the rotor when it is stationary or rotating slowly and subjected to violent gusts of wind.

A member secured to the top part of the rotor hub can be provided to absorb the impacts and forces received by the abutment part of each lever, which is preferably mounted on its pivot with sufficient clearance to protect the pivot from the aforementioned impacts and forces. For example, the second arm of each pivoting lever is shaped so that, when the lever is in the stop position, it bears along at least part of its length against the periphery of a ring secured to the top part of the hub concentric with the rotor axis; if required, the ring can also be adapted to bear the pivots of all the levers.

By way of example, an embodiment of the device according to the invention is described hereinafter and diagrammatically illustrated in the accompanying drawings, in which:

FIG. 3 shows a detail in perspective of the device according to the invention.

Figure 1:
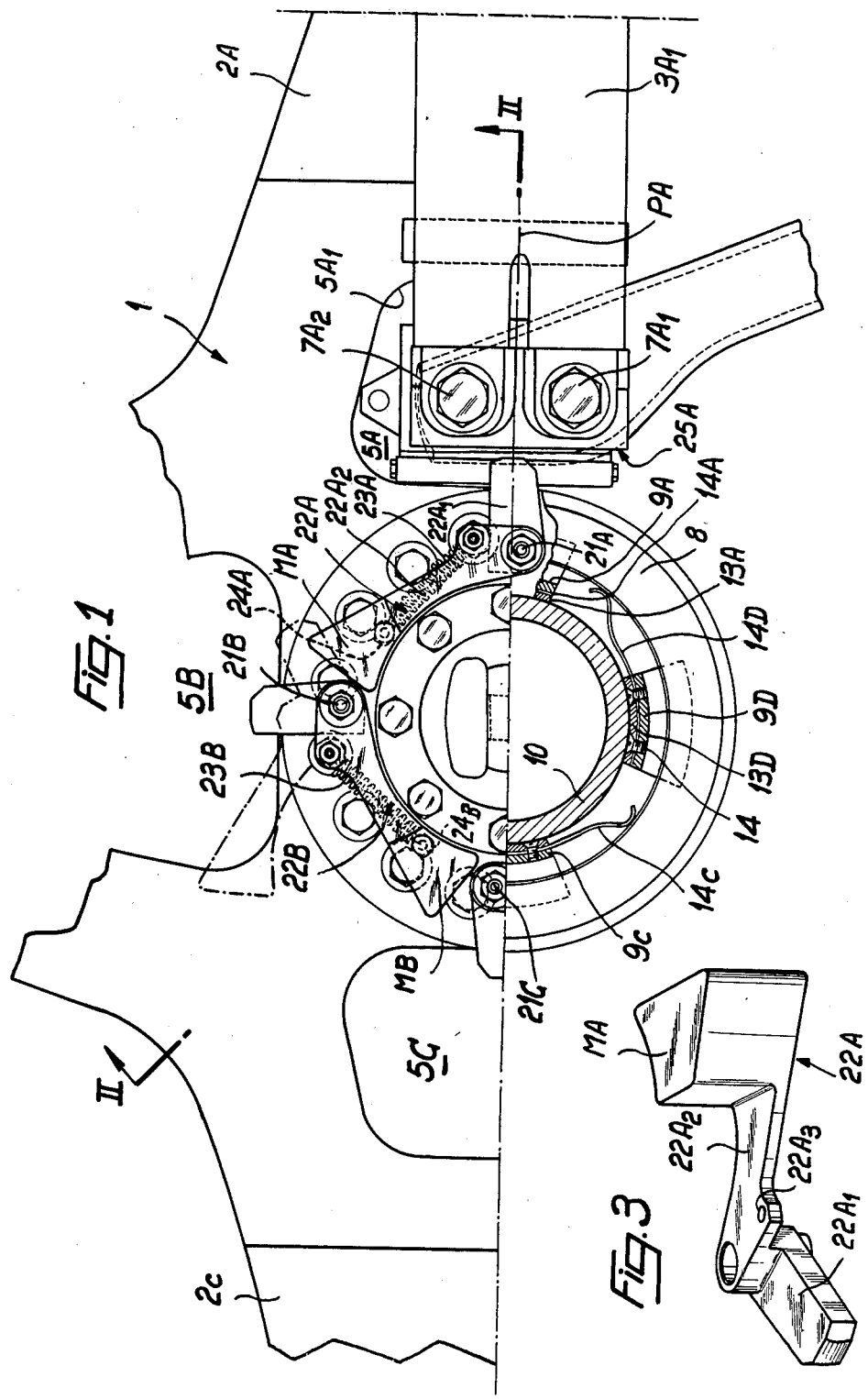
FIG. 1 is a partial, partly cut-away plan view of a helicopter rotor hub equipped with a device according to the invention.
Figure 2:
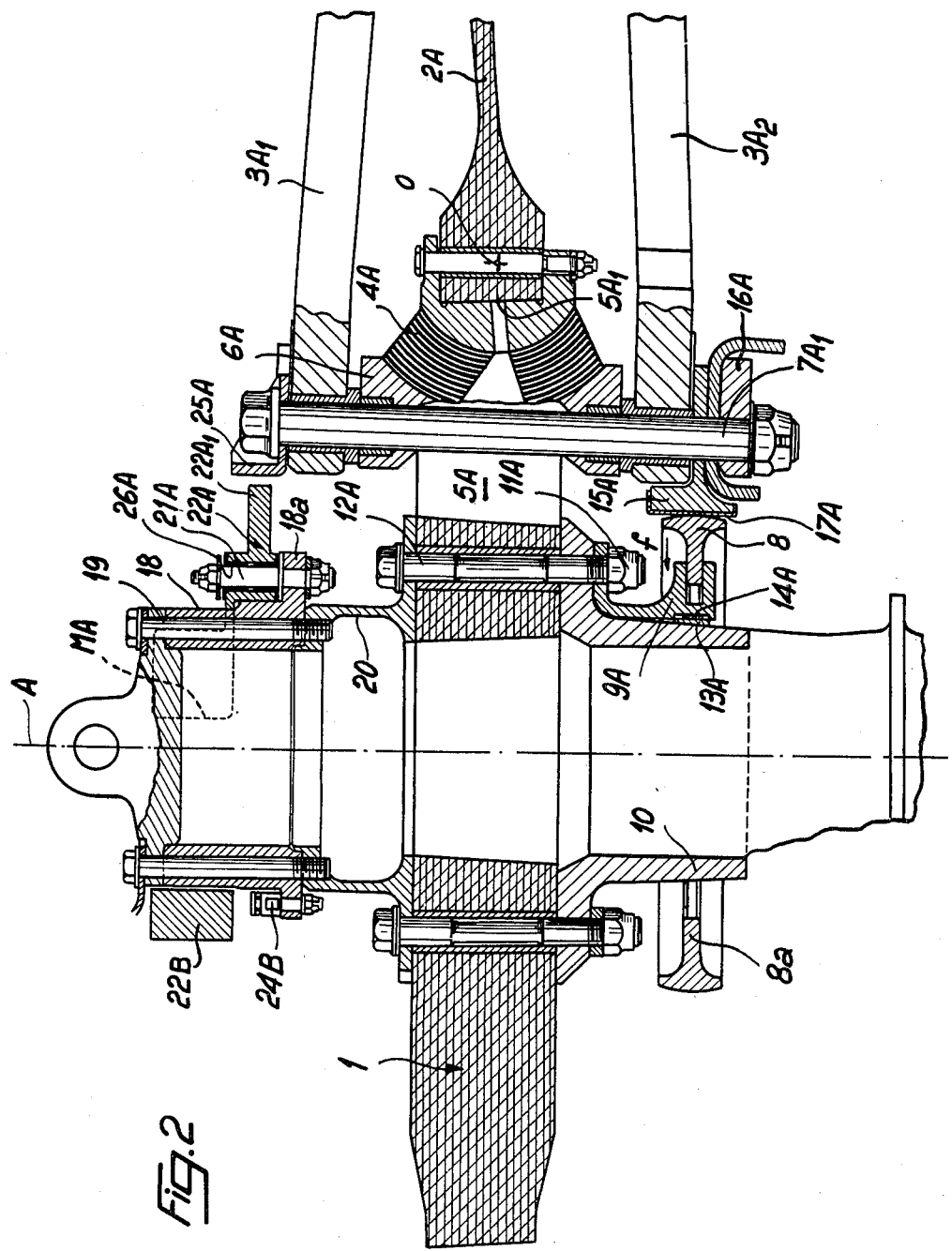
FIG. 2 is a view in section along line II—II of FIG. 1.

In FIGS. 1 and 2, reference 1 denotes the hub of a main helicopter rotor, e.g., of the kind described in the Applicant's U.S. Pat. Nos. 3,967,918 and 4,012,169. The hub is preferably star-shaped and, for each rotor blade, has a connecting arm 2A flattened in the plane of the star and flexible in the direction perpendicular to the plane, i.e., in the direction of the geometrical axis A of the rotor (FIG. 2). A yoke having a top arm 3A1 and a bottom arm 3A2 grips the corresponding connecting arm 2A and is inserted between hub 1 and each of its blades (not shown in the drawings).

The two arms 3A1, 3A2 of each yoke are connected to hub 1 by a spherical abutment of laminated elastomer 4A, which is compressed between (a) the outer edge 5A1 of an aperture 5A in hub 1 at the base of the corresponding arm 2A and (b) a component 6A, which is held between the ends of arms 3A1 and 3A2 of the corresponding yoke, by bolts 7A1 and 7A2.

Hub 1 and its arms 2A are mainly made of glass fibre coated with thermosetting resin. The connection between each blade root and hub 1 is very flexible, mainly because of the thinness of the arms 2A of the star-shaped hub, and this facilitates flapping movements of each blade, whose geometrical axis extends substantially through the geometrical centre of the spherical abutment 4A (the centre is denoted by 0 on the right of FIG. 2). The aforementioned flexibility of rotors of this known kind is very advantageous in flight but has the following disadvantage. When the rotor stops or rotates slowly, the blade is subjected only to small or zero centrifugal forces and its weight tends to bend arms 2A strongly downwards and deform the spherical abutment 4A around the horizontal axis extending through its centre 0. The result may be that the end of one or more blades of an aforementioned rotor may strike a tail unit of the helicopter or the cabin or even the ground, resulting in serious damage, specially when the rotor is turning slowly. On the other hand, rotors of the aforementioned kind are often equipped with relatively flexible blades, which are very sensitive to gusts of wind when the rotor stops or moves slowly. Such gusts are particularly violent on some sea launching platforms (floating or stationary, more particularly for under-water oil prospecting), on which the helicopters have to land. Clearly, the wind forces on the motionless or slowly-rotating blades will further increase the risk of collision between the blade ends and parts of the helicopter or platform.

According to the invention, the rotor illustrated in FIGS. 1 and 2 is equipped with a common lower abutment for all the blades, the abutment comprising a reciprocal ring 8 having a T cross-section. As shown in FIG. 2, the thin inner part 8a of ring 8 is borne by three stirrups 9A having a bent component at their top, for securing them to the top collar of the rotor shaft 10, by means of screws 11a secured to the bottom threaded ends of bolts 12A for securing the thick central part of hub 1 to the aforementioned top collar of shaft 10. At its bottom, each stirrup 9A forms a fork which engages the thin inner part of ring 8 so that it can slide freely in a plane perpendicular to the rotor axis A.

In the embodiment in question, a component 13A or 13D made of synthetic material having high resistance to wear and impacts, is inserted between the side wall of rotor shaft 10 and the bottom part of each stirrup 9A or 9D, to which the aformentioned component is secured by screws 14 (FIG. 1).

One end of a spring strip 14A, 14C or 14D is secured between each component 13A–13D and the bottom part of each stirrup 9A and its other end is curved so as to co-operate with the inner edge of ring 8, as shown in the bottom half of FIG. 1. Since all the spring strips 14A have the same shape, they tend to hold ring 8 in a central position, exactly concentric with axis A, when ring 8 is not subjected to any other force. According to the invention likewise, the bottom arm 3A2 of the yoke connecting each blade to rotor hub 1 has a bearing slide 15A. As shown in FIG. 2, the slide has e.g., a T cross-section, having a perforated flange which fits between (a) the bottom surface of the inner end of yoke arm 3A2 and (b) a block 16A, the assembly being held together by the nut which is normally screwed to the threaded bottom end of the aforementioned bolt 7A1. Preferably, the substantially vertical surface of slide 15A opposite ring 8 is covered with a thin layer 17A of material having high resistance to impacts and wear. The assembly is dimensioned in known manner so that when the rotor stops, the blades bend owing to their weight, more particularly by deformation of arms 2A and spherical abutments 4A, until the corresponding slides 15A come in direct contact with the reciprocal ring 8 as shown in FIG. 2. Ring 8 continues to occupy its central position as previously defined, owing to the symmetry of the blades around axis A and the fact that their weights are equal. In the aforementioned position, the pitch of each blade can still be changed, while the corresponding slide 15A is moved in contact with the outer surface of ring 8.

According to the invention, a ring 18 is secured to the top part of hub 1 by bolts 19 screwed in an intermediate ring 20 secured by bolts 12A to the top surface of hub 1. The bottom of ring 18 has an outer collar 18a to which shafts or pivots 21A are secured, e.g., by bolts. Each pivot 21A is secured to collar 18a parallel to the rotor axis A and near the axial plane of symmetry of one of the blades when at rest. It can been seen, e.g., in the plan view in FIG. 1, that pivot 21A is mounted near the axial plane of symmetry PA of the rotor blade connected to hub 1 by yoke 3A1-3A2. A bent lever 22A, shown in perspective in FIG. 3, is mounted so that it can oscillate on each pivot 21A. Each bent lever 22A has a first arm 22A1 the end of which forms an abutment part and a second arm 22A2 bearing a weight MA at its end. A helical spring 23A or 23B is secured at one end to a pin 24A or 24B which in turn is secured to the collar 18a or ring 18. The other end of the spring acts on a suitable point (22A3 in FIG. 3) of each bent lever 22A. The assembly is constructed so that, when the rotor stops, each spring 23A brings the corresponding pivoting lever 22A into a stop position where its arm 22A2 bears against the periphery of ring 8, to which the shape of the corresponding side face of arm 22A2 is made to correspond, as shown in the top half of FIG. 1. According to the invention, arms 22A1 and 22A2 of each bent lever 22A form an angle such that, in the stop position shown in FIG. 1, the first arm 22A1 extends almost parallel to the axial plane of symmetry PA of the corresponding blade so that the end of arm 22A1 forms a rigid abutment for a bearing means 25A secured to the top arm 3A1 of the corresponding yoke, e.g., by the head of a bolt 7A1. When the rotor rotates, the angle of each bent lever 22A is such that the centrifugal force applied to the corresponding weight MA tends to overcome the force of spring 23A and pivot lever 22A in a direction such that the end of its first arm 22A1 forming an abutment moves away from the corresponding bearing means 25A.

The embodiment in question also comprises the following improvement: Rings of synthetic high-strength material 26A are engaged around each pivot 21A and the outer diameter of the rings is slightly less than the inner diameter of the corresponding aperture in the bent lever 22A. The clearance of the lever on its pivot 21A is made sufficient for the impacts and forces received by the abutment part at the end of arm 22A1 to be directly transmitted to ring 18 by the corresponding edge of arm 22A2, but not to the pivot 21A of the aforementioned lever, so that the pivot is protected from the aforementioned impacts and forces.

The previously-described device according to the invention is constructed so that it operates as follows:

When the rotor is at rest, the downward sag of all the blades is limited by their lower slides (e.g., 15A) coming directly into contact with the reciprocal ring 8, which is thus held in its central position. In that case, as shown in the right of FIG. 2, small gaps are left between (a) the abutment parts formed by the ends of arms 22A1 of each pivoting lever 22A and (b) the upper bearing means 25A of the corresponding blade. If a gust of wind exerts downward pressure on the blade connected to the hub by yoke 3A1-3A2, the bearing slide 15A presses the reciprocal ring towards the rotor axis A, as shown by arrow f, so that part of ring 8 on the other side of slide 15A relative to axis A tends to move the slide of the opposite blade away from axis A, thus bringing its upper bearing means (corresponding to 25A) in contact with the upper abutment formed by the end of the said first arm of the pivoting lever associated with the opposite blade. Consequently, the rising motion of the opposite blade is limited by the corresponding upper abutment.

When the rotor is turning slowly, the centrifugal force acting on weight MA of each pivoting lever 22A is insufficient to overcome the force of the corresponding spring 23A and move the abutment part formed by the end of its first arm 22A1, from the bearing means 25A of the corresponding blade. It is only when the rotor reaches a sufficient speed, e.g., a third of its rated speed, that the centrifugal force can overcome the force of the spring so that each upper abutment formed by the end of the first arm 22A1 moves sufficiently from the bearing means 25A of the corresponding blade to enable the latter to flap, more particularly to flap upwards, which is necessary to have the rotor blades moving on a conical surface. Of course, in that case, the downward flapping of all the blade is simultaneously limited by ring 8.

The invention is not limited to the described embodiment but includes all variants. Inasmuch as the pivoting arms 22A are subjected only to the action of springs such as 23A, instead of being arrested by the periphery of ring 18 when the rotor stops the said pivoting arms can be arrested by differently-constructed stopping means. The differently-constructed stopping means may be equal in number of the levers and blades. In the latter case, however, the impacts and forces on the abutment part of each lever will be taken by the pivot thereof, which must be dimensioned accordingly. Alternatively, independent means appropriate for taking the impacts and forces received by each lever can be secured to the top part of the rotor hub. The device according to the invention can be used with rotors of different kinds from that previously described. If there is no yoke 3A1-3A2 connecting the root of each blade to the hub, the bearing means 15A and 25A can be directly mounted on the corresponding blade root. Each retractable upper abutment forming part of the device according to the invention can be constructed in various known ways, which if required may be different from the previously described. The same applies to the manner of mounting the reciprocal ring constituting the lower abutment.

What we claim is:

1. In a rotary-wing aircraft main rotor assembly, including a rotor hub carried on a rotor shaft and rotatable about a fixed axis of rotation and at least two rotor blades having each its root connected to said hub via mechanical attachment means including connecting joints allowing flapping movements of said corresponding blade for rotation in opposite directions in a substantially vertical plane, about a flapping axis, substantially perpendicular to an axial plane of symmetry of said corresponding blade at rest, a device for limiting said flapping movements of said rotor blades comprising for each blade, upper abutment means for limiting the upward rotary movement of said corresponding blade beyond a first predetermined position in said substantially vertical plane, said upper abutment means comprising:

a bent lever rotatably mounted on a pivot secured to a top part of said rotor hub and having a first arm the free end of which forms an abutment part and a second arm the end of which carries a predetermined weight, a spring connecting said bent lever to said top part of said hub and being operable to normally rotate said bent lever in one direction and hold said bent lever in a predetermined position when the angular velocity of said rotor hub is below a predetermined value, said predetermined weight being operable to effect rotation of said bent lever in the opposite direct, beyond said predetermined position, when said angular velocity of said hub exceeds said predetermined value, and bearing means carried by one of the two elements comprising said corresponding blade root and said corresponding attachment means and being engageable with said abutment part of said corresponding bent lever when said bent lever is held in said predetermined position to thereby prevent the upward rotary movement of said blade beyond said first predetermined position in said substantially vertical plane wherein said corresponding pivot is parallel to said hub rotation axis near said blade axial plane of symmetry, and said first and second arms of said bent lever each rotates in a substantially horizontal plane, said first arm of said bent lever extending substantially parallel to said blade axial plane of symmetry when said bent lever is held in said predetermined position, and wherein said device also comprises lower abutment means for limiting the downward rotary movement of said corresponding blade beyond a second predetermined position in said substantially vertical plane, said upper abutment means comprising a reciprocal ring, common for all said rotor blade and slidably mounted around said rotor shaft in a plane perpendicular to said hub rotation axis, and for each rotor blade a bearing slide carried by one of said two elements, comprising said corresponding blade root and said corresponding attachment means, and being engageable with said reciprocal ring so that, when said corresponding blade is rotated downwards and said velocity is below said predetermined value, said corresponding blade tends to push inwards said reciprocal ring, which in turn tends to push upwards at least another of said rotor blades, at least one of said other blades being prevented from rotating upwards by its upper abutment means when said second predetermined position in said substantially vertical plane is reached by said corresponding blade.

2. In a rotary-wing aircraft main rotor assembly as in claim 1, wherein said mechanical attachment means connecting a blade root to said rotor hub comprises a yoke having a lower arm and an upper arm, said lower arm carrying said corresponding bearing slide directly engageable with said reciprocal ring and said upper arm carrying said corresponding bearing means directly engageable with said abutment part of said bent lever.

3. In a rotary-wing aircraft main rotor assembly as in claim 1 or 2, wherein each bent lever of said device is mounted on its pivot with a predetermined clearance allowing said bent lever to transmit the impacts and forces received by said abutment part of its first arm directly to a member secured on said top part of said bent lever when said bent lever is held in said predetermined position.

4. In a rotary-wing aircraft main rotor assembly as in claim 3, wherein said member is a ring secured concentric with said rotor axis and said second arm of each bent lever has a curved internal side face along which said second arm bears against the periphery of a part of said ring when said bent lever is held in said predetermined position.

5. In a rotary-wing aircraft main rotor assembly as in claim 4, wherein said ring presents an outer collar on which the respective pivots of said levers are mounted.

6. In a rotary-wing aircraft main rotor assembly as in claim 1 or 2, wherein said reciprocal ring has a T cross section with its thin inner part slidingly received in a fork formed at the bottom part of at least three stirrups fixed to said hub.

7. In a rotary-wing aircraft main rotor assembly as in claim 6, wherein a component of material having high resistance to wear and impacts is inserted between said rotor shaft and each said bottom part of said stirrups, a spring strip being secured by one of its ends between each said component and said corresponding bottom part and having its other end curved so as to cooperate with the inner edge of said thin inner part of said reciprocal ring, said spring strips tending to hold said reciprocal ring in a central position, concentric with rotor axis when said reciprocal ring is not engaged with any of said bearing slides.

* * * * *

UNITED STATES PATENT OFFICE
CERTIFICATE OF CORRECTION

Patent No. 4,289,448          Dated September 15, 1981

Inventor(s) Declerco et al

It is certified that error appears in the above-identified patent and that said Letters Patent are hereby corrected as shown below:

Title Page [75] Inventors, should read as follows:

[75] Inventors: Marc A. Declercq, Pelissanne; Gerard Margant, Aix en Provence, both of France Signed and Sealed this Eighth Day of December 1981

[SEAL]

Attest:

GERALD J. MOSSINGHOFF

Attesting Officer      Commissioner of Patents and Trademarks